United States Patent
Spertus

(10) Patent No.: US 12,504,955 B1
(45) Date of Patent: Dec. 23, 2025

(54) IDIOMATIC PROGRAMMATIC INTERFACE GENERATION

(71) Applicant: Amazon Technologies, Inc., Seattle, WA (US)

(72) Inventor: Mike Paul Spertus, Chicago, IL (US)

(73) Assignee: Amazon Technologies, Inc., Seattle, WA (US)

( * ) Notice: Subject to any disclaimer, the term of this patent is extended or adjusted under 35 U.S.C. 154(b) by 364 days.

(21) Appl. No.: 18/342,175

(22) Filed: Jun. 27, 2023

(51) Int. Cl.
G06F 8/35 (2018.01)
G06F 8/30 (2018.01)
G06F 40/211 (2020.01)
G06N 20/00 (2019.01)

(52) U.S. Cl.
CPC .............. *G06F 8/35* (2013.01); *G06F 8/315* (2013.01); *G06F 40/211* (2020.01); *G06N 20/00* (2019.01)

(58) Field of Classification Search
CPC ........ G06F 8/315; G06F 40/211; G06N 20/00
See application file for complete search history.

(56) References Cited

U.S. PATENT DOCUMENTS

| 7,669,209 B2 | 2/2010 | Inohara et al. |
| 8,510,762 B1* | 8/2013 | Gregorio ............... G06F 8/36 717/106 |
| 10,042,740 B2 | 8/2018 | Bird et al. |
| 11,609,753 B2 | 3/2023 | Samuel et al. |
| 2016/0165010 A1* | 6/2016 | Bacovsky ............... H04L 67/10 709/203 |
| 2017/0102925 A1* | 4/2017 | Ali ............................ G06F 8/30 |
| 2019/0370370 A1* | 12/2019 | Wittern ............. G06F 16/24556 |
| 2020/0249916 A1* | 8/2020 | Schlight ............. G06F 11/3684 |
| 2020/0348912 A1* | 11/2020 | Katzenberger ........ G06F 9/5022 |
| 2024/0370243 A1* | 11/2024 | Hoban ..................... G06F 8/51 |

OTHER PUBLICATIONS

Wittern et al., "Generating GraphQL-Wrappers for REST(-like) APIs," 2018 [retrieved Aug. 15, 2025], Lecture Notes in Computer Science ((LNISA,vol. 10845)), pp. 65-83, downloaded from <url>:https://link.springer.com. (Year: 2018).*

(Continued)

*Primary Examiner* — S. Sough
*Assistant Examiner* — Stephen D Berman
(74) *Attorney, Agent, or Firm* — S. Scott Foster; Kowert, Hood, Munyon, Rankin & Goetzel, P.C.

(57) ABSTRACT

Idiomatic generation of language-specific bindings of application programming interfaces (APIs) is disclosed. A machine learning model may be trained using example programming code and interfaces of a particular programming language to identify design patterns and best coding practices for that language. A specification defining an API may then be provided in a language-neutral format. The specification may then be processed according to the trained model in coordination with language-specific and language-neutral rules to generate an idiomatic interface specification targeting the programming language that incorporates at least a portion of the identified design patterns and best coding practices, where the input specification does not incorporate the identified design patterns and best coding practices.

20 Claims, 7 Drawing Sheets

(56) References Cited

OTHER PUBLICATIONS

Jugel et al., "Generating Smart Wrapper Libraries for Arbitrary APIs," 2010 [retrieved Aug. 15, 2025], Lecture Notes in Computer Science ((LNPSE,vol. 5969)), pp. 354-373, downloaded from <url>:https://link.springer.com. (Year: 2010).*

Fernique et al., "AutoWIG: automatic generation of python bindings for C++ libraries" 2018 [retrieved Aug. 15, 2025], downloaded from <url>: https://peerj.com/articles/cs-149.pdf. (Year: 2018).*

Cottom et al., "Using SWIG to bind C++ to Python," 2003 [retrieved Aug. 15, 2025], Computing in Science & Engineering, vol. 5, Issue 2, pp. 88-97 downloaded from <url>: https://eprints.ost.ch/id/eprint/867 (Year: 2003).*

\* cited by examiner

IDIOMATIC PROGRAMMATIC INTERFACE GENERATION

BACKGROUND

Modern application development relies on the use of myriad software libraries interfaced using well defined software interfaces using standardized programming languages. With the advent of cloud-based computing and software services, these software interfaces, commonly known as application programming interfaces (APIs), have seen tremendous growth. In addition, modern programming languages continue to evolve and multiply, increasing the need for API access to be provided in an increasing number of language options. A recent approach to solving the increasing need API language bindings is to publish an API specification in a language-neutral format and provide tools for translating the language-neutral format into various language bindings as needed. However, as APIs proliferate, interactions and usage of increasing numbers of APIs becomes unmanageably complex, thus increasing the need for more user-friendly language bindings. Generating and maintaining such idiomatic bindings, however, can be labor intensive.

Figure 1:
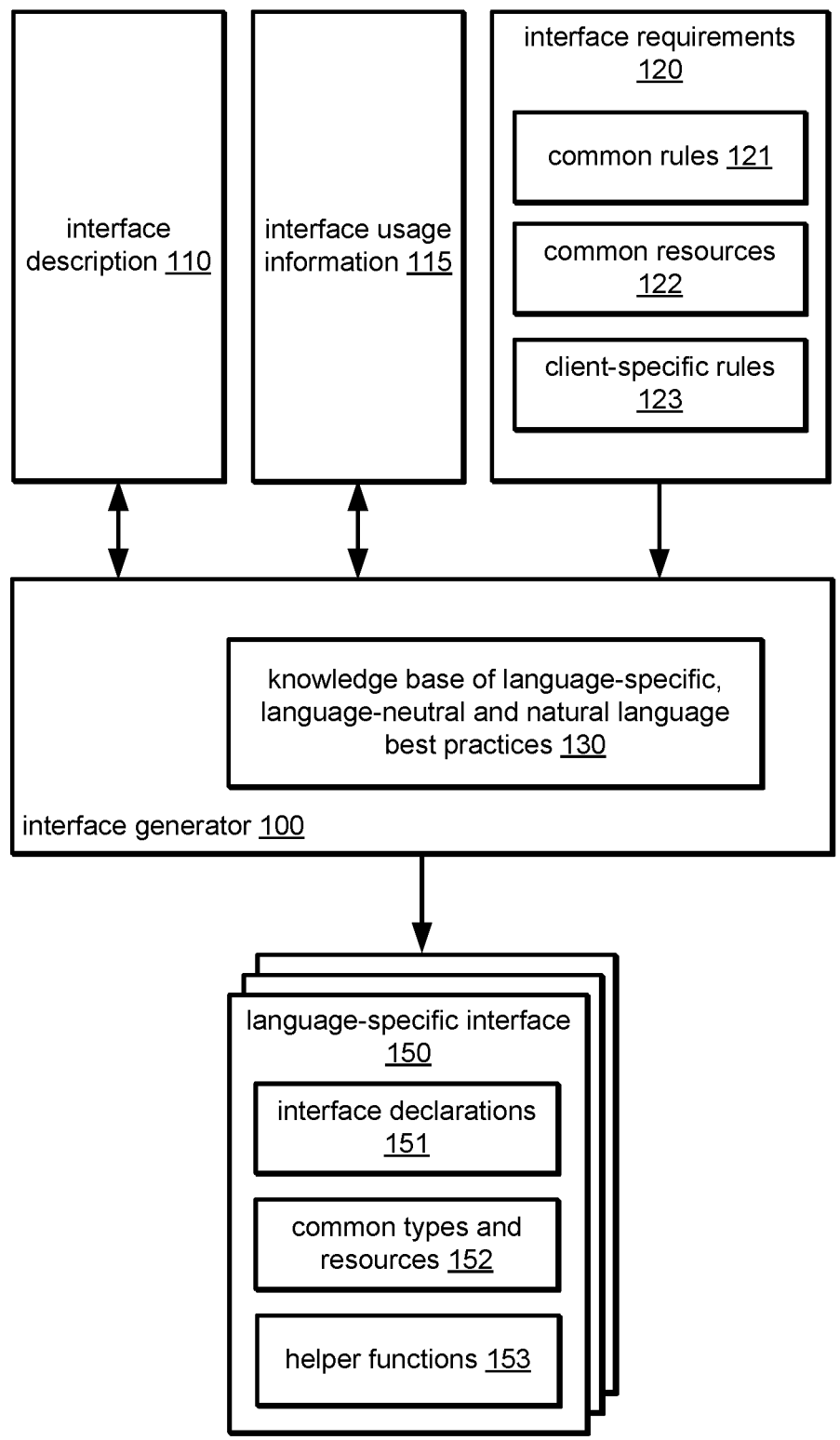
FIG. 1 illustrates a logical flowchart of an interface generator providing idiomatic generation, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Modern application development relies on the use of myriad software libraries interfaced using well defined application programming interfaces (APIs) provided through standardized programming languages. With the growth of cloud-based computing and software services, cloud-based services accessed through such APIs have seen tremendous growth. In addition, modern programming languages continue to evolve and multiply, increasing the need for API access to be provided in an increasing number of language options. A recent approach to solving the increasing need API language bindings is to publish an API specification in a language-neutral format and provide tools for translating the language-neutral format into various language bindings as needed. However, as both APIs and programming languages proliferate, interactions and usage of increasing numbers of APIs becomes unmanageably complex, thus increasing the need for more user-friendly language bindings. Generating and maintaining such idiomatic bindings, however, can be labor intensive.

To mitigate the complexity of usage of increasing numbers of APIs, a possible approach is to supplement automatically translated bindings with curated bindings that are authored manually. While such curated bindings may be much easier for clients to use, particularly in combination with other bindings of the same services vendor, the creation of curated bindings is labor intensive and creates maintenance costs for the API vendors. Furthermore, the proliferation of development languages makes this approach increasingly unmanageable. What is needed is to combine the benefits of hand-generated, curated APIs with the sustainability benefits of automatic generation of bindings through the use of translatable interface specifications using a language-neutral format.

Idiomatic generation of language-specific bindings of application programming interfaces (APIs) is disclosed. A knowledge base containing example programming code, interfaces, design patterns and best practices for one or more programming languages may be applied, for example through application of a trained machine learning model, to identify best coding practices for those language(s). A specification defining an API may then be provided in a language-neutral format. The specification may be processed according to the knowledge base, for example using the trained model, in coordination with language-specific and language-neutral rules to generate idiomatic interface specification(s) targeting the programming language(s), where the idiomatic interface specification(s) incorporate at least a portion of the identified design patterns and best coding practices and the input specification does not incorporate the identified design patterns and best coding practices.

FIG. 1 illustrates a logical flowchart of an interface generator providing idiomatic generation, according to some embodiments. An interface description 110 formatted in in a language-neutral specification language or format may be submitted for translation into one or more language-specific interfaces 150 to an interface generator 100 in various embodiments. The specification may be provided in the form of a binary or preferably human-readable file for which a schema is either known or integrated. Examples may include JavaScript Object Notation (JSON) schema records, Yet Another Markup Language (YAML) schema records, Standard Generalized Markup Language (SGML) schema records, Extensible Markup Language (XML) schema records, CSV entries or other convenient formats. It should be understood that these are merely examples of encoding schemes, the examples are not intended to be limiting and API specifications may be provided in any number of formats in various embodiments.

The interface specification 110 may include a variety of information including definitions to access various methods of callable functions, definitions of data types, attributes, function return values, error codes, functions to assist marshalling of data, conversions of units, and so on. While the interface specification 110 may include features usable to support capabilities of programming languages and environments not supported in other programming languages and environments, the interface specification 110 may be broadly translated to any number of output formats with varying numbers of features. Thus, callable methods and functions of the API described by the interface specification 110 may support a least capable subset of capabilities of the collective output formats targeted, with best practices and design approaches of more capable programming languages and environments not directly supported in the interface specification 110. Therefore, a direct mechanical translation of the interface specification 110 into a language-specific interface 150 may not conform to best practices of an output language for that interface, in various embodiments.

The interface description 110 may describe an interface for which previous versions exist, in some embodiments. In this case, bindings for the interface description 110 may be further constrained by a best practice to maintain compatibility with these previous versions. In some embodiments, version identification may be provided as part of the interface description 110, including identification of previous versions, if any. In addition to previous version identification, the interface description 110 may include partial or complete descriptions of previous versions of the API, in some embodiments. To facilitate this, in some embodiments, the interface generator 100 may be able to output specifications in addition to reading specifications to the interface description 110 while in other embodiments the interface generator may output language-neutral specifications of current versions of interfaces derived from the interface description 110. Therefore, additional interface information may be required beyond the information provided in the interface description 110, that information either written into the interface description 110 or written external to the interface description 110. Information external to the interface description 110 may be considered part of interface usage information 115.

To improve usability of the API described by the interface specification 110, the interface generator 100 may access a knowledge base of programming best practices 130, including language-specific, language-neutral and natural language best practices. For example, a collection of design patterns describing well-established solution approaches to understood programming problems may be included, definitions for common data structures and data types, definitions of common data translations, data unit conversions, access, authentication and security mechanisms, and so forth may be included in the knowledge base. These design patterns and best practices may be organized by, or identifiable by, various categories of services provided by the API. For example service categories may be storage services, compute services, database or query services, networking services, machine learning services, and so forth. These examples of API or service categories are not intended to be limiting and any number of categories may be envisioned.

To identify a particular category to which the API is directed, additional interface usage information 115 may be provided. In some embodiments, this interface usage information 115 may be provided in a number of ways. For example, in some embodiments the interface specification 110 itself may include specification of interface category or interface usage. In other embodiments, interface usage or category may be provided by a client or developer requesting generation of language bindings for the API. In still other embodiments, interface category or interface usage may be deduced from additional documentation associated with the API such as discussed below in FIG. 3. These are merely examples of providing interface usage information 115 and are not intended to be limiting.

The interface generator 100 may apply the various best practices of the knowledge base 130 to generate idiomatic APIs providing the functionality of the APIs of the interface description 110, where the idiomatic APIs conform to at least a portion of the best practices of the knowledge base while retaining the functionality offered by the APIs of the interface description 110. For example, an API of the interface description 110 might describe an executable function that requires, as an input parameter, data of a particular type that is inconvenient or represented differently that otherwise common for a particular programming language. For example, the parameter may be integral or floating point numeric type that is non-standard for the particular programming language, or may be a string format different than supported in the particular programming language. In another example, the parameter may provide authorization credentials for an operation, where the credentials may take various forms other than supported by the API of the interface description 110. In still other examples, parameters may be expressed in units particular to the API while the particular programming language may standardize on different units. In some embodiments, a particular programming language may support optional or default arguments whereas the API of the interface description 110 may support fewer more restrictive options. In some embodiments, usage of particular API functions may require encoding of redundant information that is deducible from programming context, thereby introducing opportunities for errors in usage of the API. In this case, automatic generation of this information may be employed to simplify usage of the API through the idiomatic bindings and reduce opportunities for errors.

In addition, interface generator 100 may, though applying best practices of knowledge base 130, include additional resources beyond the callable methods and functions described in interface description 110. Therefore, in addition to interface declarations 151 output to the language specific interface 150, the interface generator 100 may include common data types, data structures, variables, objects and other resources 152 that may be useful to a client when using the API described in interface description 110, in various embodiments. Furthermore, the interface generator 100 may provide executable code in the form of helper functions 153, for example to marshal data, perform unit conversions, and so forth. Furthermore, while the API of the interface description 110 may document callable functions and methods, a target language of a language specific interface may provide other mechanisms for executing code, such as lambda functions, for example. As such, the interface generator 100 may include support for executing various methods or functions of the API in alternative forms and further apply various best practices and design patterns suitable in the target language but not describable in the language-neutral format, in various embodiments.

Other example extensions to the API of the interface description 110 that the interface generator 100 may provide in various embodiments is integration into standardized error handling protocols, addition of standardized attributes to resources, standardization of naming conventions, support for integrated development environment (IDE) protocols and so forth. As such options may take several forms, the interface generator 100 may be configurable using various interface requirements 120. The requirements may include common, language-neutral rules 121, common resources 122 such as common attributes added to resource declarations, and client-specific rules 123. In some embodiments, client-specific rules 123 may enable the interface generator 100 to generate custom bindings optimized for usage by particular clients.

Figure 2:
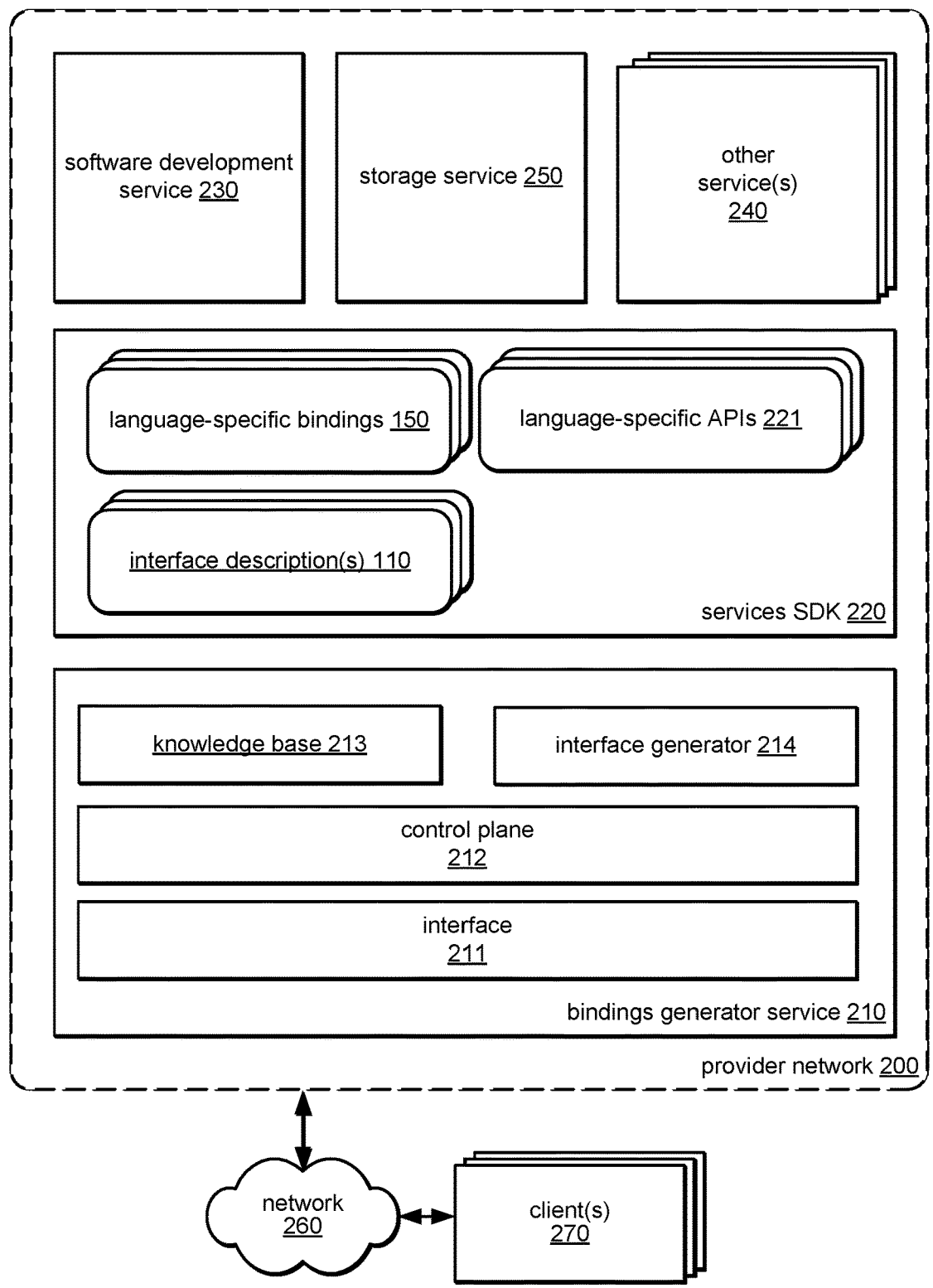
FIG. 2 illustrates an example provider network that may implement an interface generator service providing idiomatic generation, according to some embodiments.

FIG. 2 illustrates an example provider network that may implement an interface generator service providing idiomatic generation, according to some embodiments. Provider network 200 may be a private or closed system or may be set up by an entity such as a company or a public sector organization to provide one or more services (such as various types of cloud-based storage) accessible via the Internet and/or other networks to clients 270, in one embodiment. Provider network 200 may be implemented in a single location or may include numerous data centers hosting various resource pools, such as collections of physical and/or virtualized computer servers, storage devices, networking equipment and the like (e.g., computing system 2000 described below with regard to FIG. 7), needed to implement and distribute the infrastructure and services offered by the provider network 200, in one embodiment. In some embodiments, provider network 200 may implement various computing resources or services, such as bindings generator service 210, software development service 230, storage service 250 and/or any other type of network-based services 240 (which may include a virtual compute service and various other types of storage, database or data processing, analysis, communication, event handling, visualization, data cataloging, data ingestion (e.g., ETL), and security services), in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 7 and described below, in one embodiment. In various embodiments, the functionality of a given system or service component (e.g., a component of bindings generator service 210 may be implemented by a particular node or may be distributed across several nodes. In some embodiments, a given node may implement the functionality of more than one service system component (e.g., more than one data store component).

Bindings generator service 210 may implement interface 211 to allow clients (e.g., client(s) 270 or clients implemented internally within provider network 200, such as a client application hosted on another provider network service like software development service 230 or virtual compute service) to send requests to perform bindings generator tasks. In at least some embodiments, bindings generator service 210 may support various types of tasks. For example, bindings generator service 210 may implement interface 211 (e.g., a graphical user interface, programmatic interface that implements Application Program Interfaces (APIs) and/or a command line interface) may be implemented so that a client application can create or otherwise manage language-specific interfaces stored in storage service 250, or other storage locations or sources within provider network 200 or external to provider network 200 (e.g., on premise data storage in private networks) for use with software development compilers and other tools such as provided by the software development service 230 or other tools external to provider network 200.

Bindings generator service 210 may implement a control plane 212 to perform various control operations to implement the features of bindings generator service 210. For example, control plane 212 may monitor the health and performance of requests at different components and processing tasks resources (e.g., the health or performance of various nodes, instances, servers, or other computing resources implementing these features of bindings generator service 210). If a node fails, a request fails, or other interruption occurs, control plane 212 may be able to restart a job to complete a request (e.g., instead of sending a failure response to the client). Control plane 212 may, in some embodiments, may arbitrate, balance, select, or dispatch requests to different node(s) in various embodiments. For example, control plane 212 may receive requests interface 211 which may be a programmatic interface, and identify an available computing to begin work on the request.

Bindings generator service 210 may employ functions of an interface generator, similar to the interface generator 100 discussed above with regard to FIG. 1. Data storage service 250 may implement different types of data stores for storing, accessing, and managing data on behalf of clients 270 as a network-based service that enables clients 270 to operate a data storage system in a cloud or network computing environment. Data storage service(s) 250 may also include various kinds relational or non-relational databases, in some embodiments. Data storage service 250 may include object or file data stores for putting, updating, and getting data objects or files, in some embodiments. Data storage service 250 may be accessed via programmatic interfaces (e.g., APIs) or graphical user interfaces.

Generally speaking, clients 270 may encompass any type of client that can submit network-based requests to provider network 200 via network 260, including requests for bindings generator service 210 (e.g., a request to process interface specifications to generate idiomatic interfaces for particular programming languages). For example, a given client 270 may include a suitable version of a web browser, or may include a plug-in module or other type of code module that can execute as an extension to or within an execution environment provided by a web browser. Alternatively, a client 270 may encompass an application (or user interface thereof), a media application, an office application or any other client application that may make use of binding generator service 210 (or other provider network 200 services) to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 270 may be an application that can interact directly with provider network 200. In some embodiments, client 270 may generate network-based services requests according to a Representational State Transfer (REST)-style network-based services architecture, a document- or message-based network-based services architecture, or another suitable network-based services architecture.

In some embodiments, a client 270 may provide access to provider network 200 to other applications in a manner that is transparent to those applications. Clients 270 may convey network-based services requests (e.g., requests to interact with services like bindings generator service 210) via network 260, in one embodiment. In various embodiments, network 260 may encompass any suitable combination of networking hardware and protocols necessary to establish network-based communications between clients 270 and provider network 200. For example, network 270 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 270 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 270 and the Internet as well as between the Internet and provider network 200. It is noted that in some embodiments, clients 270 may communicate with provider network 200 using a private network rather than the public Internet.

Figure 3:
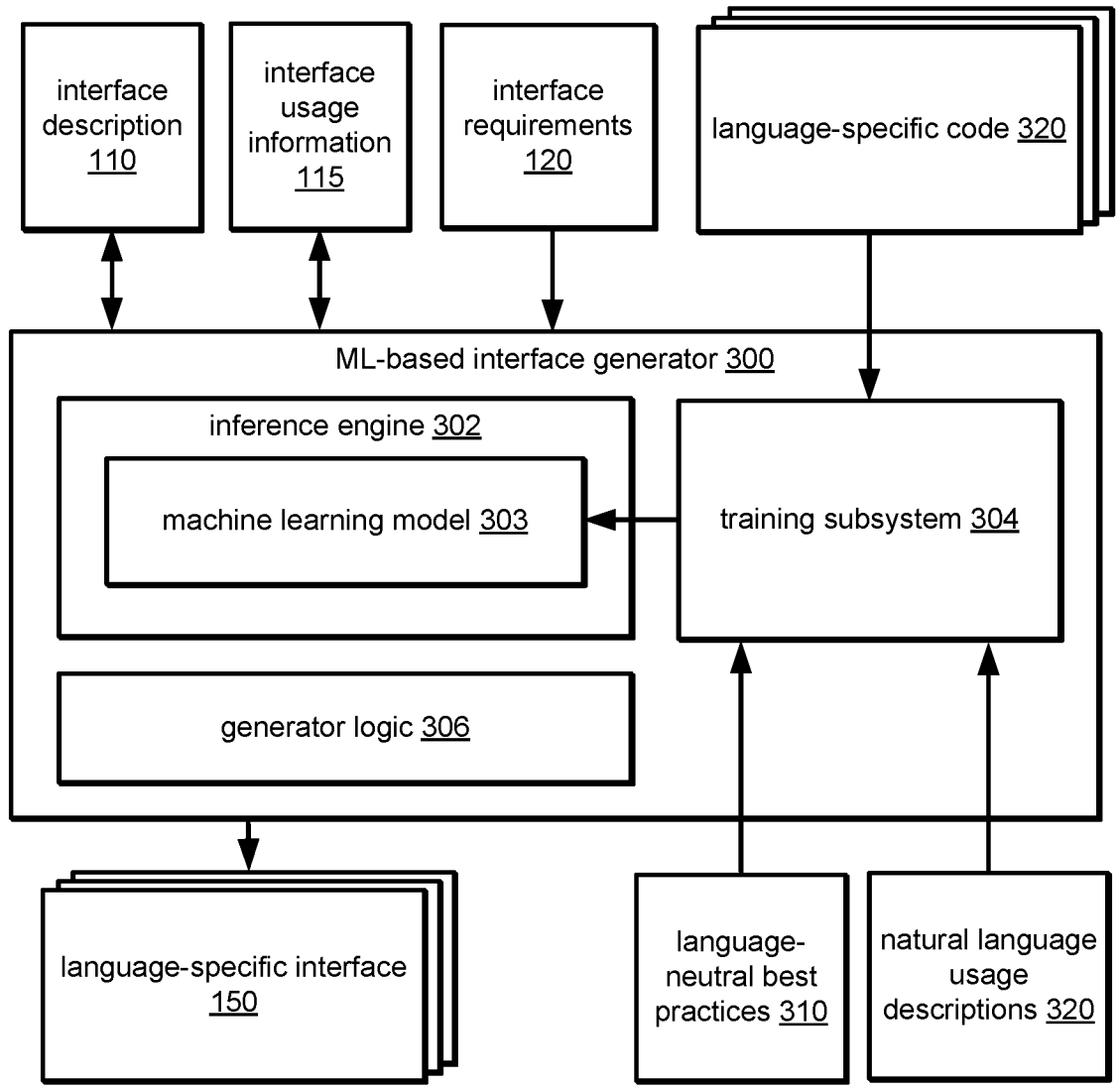
FIG. 3 illustrates a logical flowchart illustrating generating of idiomatic interfaces specified using an interface definition language using a machine learning model, according to some embodiments.

FIG. 3 illustrates a logical flowchart illustrating generating of idiomatic interfaces specified using an interface definition language using a machine learning model, according to some embodiments. An interface description 110 formatted in in a language-neutral specification language or format may be submitted for translation into one or more language-specific interfaces 150 to an interface generator 300 in various embodiments. The specification may be provided in the form of a binary or preferably human-readable file for which a schema is either known or integrated. Examples may include JavaScript Object Notation (JSON) schema records, Yet Another Markup Language (YAML) schema records, Standard Generalized Markup Language (SGML) schema records, Extensible Markup Language (XML) schema records, CSV entries or other convenient formats. It should be understood that these are merely examples of encoding schemes, the examples are not intended to be limiting and API specifications may be provided in any number of formats in various embodiments.

The interface specification 110 may include a variety of information including definitions to access various methods of callable functions, definitions of data types, attributes, function return values, error codes, functions to assist marshalling of data, conversions of units, and so on. While the interface specification 110 may include features usable to support capabilities of programming languages and environments not supported in other programming languages and environments, the interface specification 110 may be broadly translated to any number of output formats with varying numbers of features. Thus, callable methods and functions of the API described by the interface specification 110 may support a least capable subset of capabilities of the collective output formats targeted, with best practices and design approaches of more capable programming languages and environments not directly supported in the interface specification 110. Therefore, a direct mechanical translation of the interface specification 110 into a language-specific interface 150 may not conform to best practices of an output language for that interface, in various embodiments.

To improve usability of the API described by the interface specification 110, the interface generator 100 may process the interface specification 110 using an inference engine 302 including a machine learning model 303 trained by a training subsystem 304 using language-specific code that includes examples of design patterns for the specific languages as well as programming best practices. For example, a collection of design patterns describing well-established solution approaches to understood programming problems may be included, definitions for common data structures and data types, definitions of common data translations, data unit conversions, access, authentication and security mechanisms, and so forth may be included in the training data. These design patterns and best practices may be organized by, or identifiable by, various categories of services provided by the API. For example service categories may be storage services, compute services, database or query services, networking services, machine learning services, and so forth. These examples of API or service categories are not intended to be limiting and any number of categories may be envisioned.

In addition, language-neutral and natural language best practices and design patterns 310 may be included in training data. These may, for example, be expressed in pseudo-code similar to well-defined programming languages while not usable as input to software development tools to generate executable code. In other examples, such best practices and design patterns may be expressed in languages defined specifically to describe such design patterns without being directly executable or compilable into executable code.

Furthermore, natural-language usage descriptions 320 may be included in the training data, in some embodiments. To identify a particular category to which the API is directed, the machine learning model may be trained to recognize various interface categories using natural language descriptions or discussion pertaining to existing APIs other than the API specified in interface description 110. Examples of such information include technical descriptions of the APIs, use cases of the APIs including source code provided in the plurality of languages or in pseudo-code similar to the plurality of languages, client discussions of the API, previous versions of the API or APIs similar to the API, frequently asked questions (FAQs) regarding the API or similar APIs and descriptions of similarities and differences of the API to the one or more other APIs. These examples are not intended to be limiting and a variety of natural language information may be envisioned to include in the training data.

Additional interface usage information 115 may be provided. In some embodiments, this interface usage information 115 may be provided in a number of ways. In addition to examples for identifying API categories discussed above in FIG. 1, the inference engine 302 may, in some embodiments, process natural language information of 115 regarding the usage of the interface specified in the interface description 110 to an determine API category. For example, natural language descriptions such as technical descriptions of the APIs, use cases of the APIs including source code provided in the plurality of languages or in pseudo-code similar to the plurality of languages, client discussions of the API or previous versions of the API, frequently asked questions (FAQs) regarding the API and descriptions of similarities and differences of the API to the one or more other APIs may be processed by the inference engine to deduce interface category. These are merely examples of natural language interface usage information 115 and are not intended to be limiting. In this way, the inference engine 302 may provide both identification of API categories through natural language processing and generation of idiomatic interfaces according to the determined category, in some embodiments.

The interface generator 100 may apply the various best practices via processing by the inference engine to generate idiomatic APIs providing the functionality of the APIs of the interface description 110, where the idiomatic APIs conform to at least a portion of the best practices of the knowledge base while retaining the functionality offered by the APIs of the interface description 110. For example, an API of the interface description 110 might describe an executable function that requires, as an input parameter, data of a particular type that is inconvenient or represented differently that otherwise common for a particular programming language. For example, the parameter may be integral or floating point numeric type that is non-standard for the particular programming language, or may be a string format different than supported in the particular programming language. In another example, the parameter may provide authorization credentials for an operation, where the credentials may take various forms other than supported by the API of the interface description 110. In still other examples, parameters may be expressed in units particular to the API while the particular programming language may standardize on different units. In some embodiments, a particular programming language may support optional or default arguments whereas the API of the interface description 110 may support fewer more restrictive options. In some embodiments, usage of particular API functions may require encoding of redundant information that is deducible from programming context, thereby introducing opportunities for errors in usage of the API. In this case, automatic generation of this information may be employed to simplify usage of the API through the idiomatic bindings and reduce opportunities for errors.

In addition, interface generator 100 may, though applying best practices of knowledge base 130, include additional resources beyond the callable methods and functions described in interface description 110. Therefore, in addition to interface declarations output to the language specific interface 150, the interface generator 100 may include common data types, data structures, variables, objects and other resources that may be useful to a client when using the API described in interface description 110, in various embodiments. Furthermore, the interface generator 100 may provide executable code in the form of helper functions, for example to marshal data, perform unit conversions, and so forth. Furthermore, while the API of the interface description 110 may document callable functions and methods, a target language of a language specific interface may provide other mechanisms for executing code, such as lambda functions, for example. As such, the interface generator 100 may include support for executing various methods or functions of the API in alternative forms and further apply various best practices and design patterns suitable in the target language but not describable in the language-neutral format, in various embodiments.

Other example extensions to the API of the interface description 110 that the interface generator 100 may provide in various embodiments is integration into standardized error handling protocols, addition of standardized attributes to resources, standardization of naming conventions, support for integrated development environment (IDE) protocols and so forth. As such options may take several forms, the interface generator 100 may be configurable using various interface requirements 120. The requirements may include common, language-neutral rules, common resources such as common attributes added to resource declarations, and client-specific rules. In some embodiments, client-specific rules may enable the interface generator 100 to generate custom bindings optimized for usage by particular clients.

Figure 4:
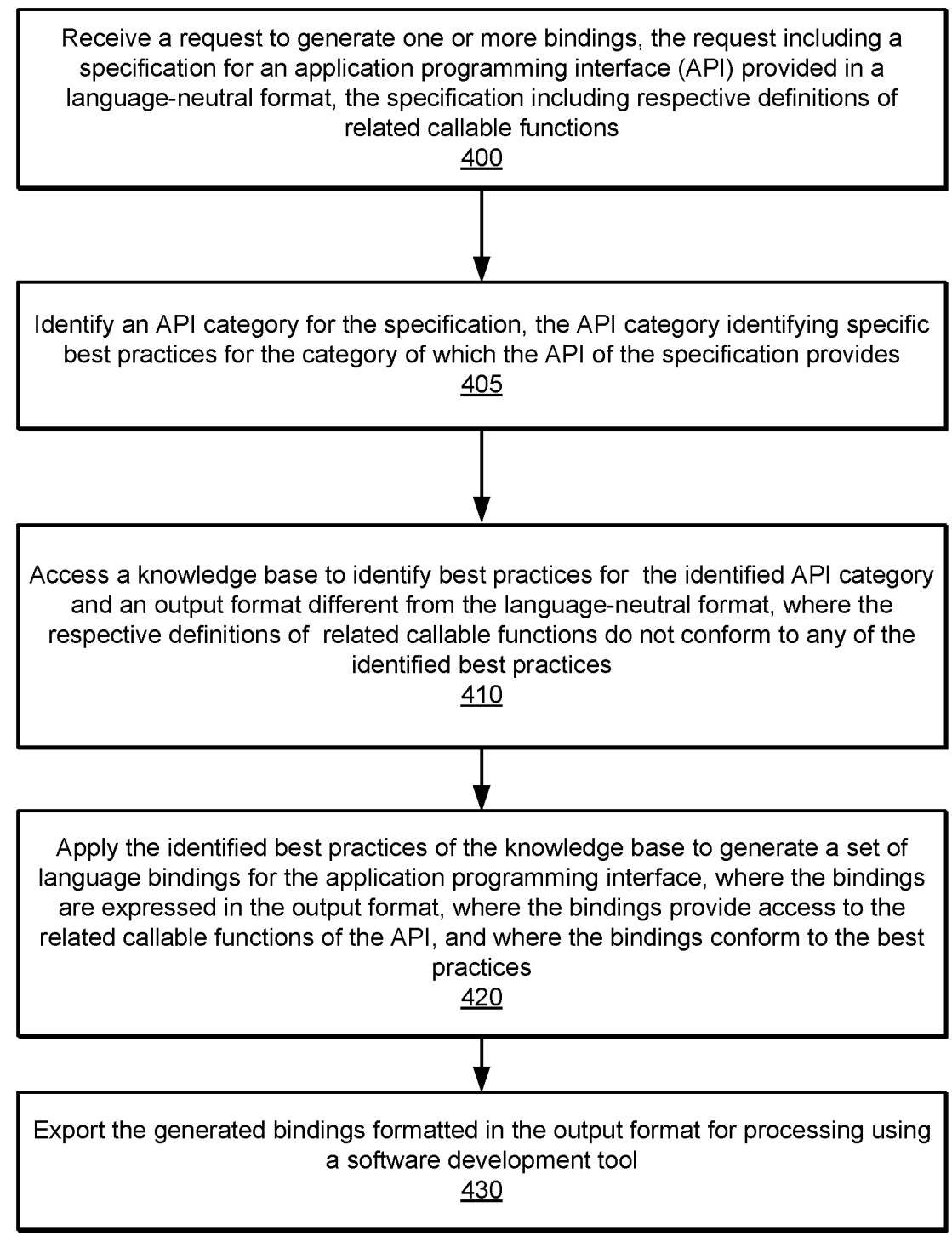
FIG. 4 illustrates a logical flowchart illustrating generating of idiomatic interfaces specified using an interface definition language, according to some embodiments.

FIG. 4 illustrates a logical flowchart illustrating generating of idiomatic interfaces specified using an interface definition language or format, according to some embodiments. The process begins at step 400 where a request to generate binding(s) for an application programming interface (API) may be received, the request including a specification for the API, such as the interface description 110 of FIG. 1. The request may be received at an interface generator, code generator or artifact generator such as the interface generator 100 of FIG. 1, where the specification includes at least respective definitions of related callable functions or methods of an API. This specification may be received, in some embodiments, to generate one or more idiomatic language-specific interface definitions, executable code or code definitions, or artifacts for various output languages or formats different from the interface definition format. These language-specific interface definitions are generated to conform to one or more programming best practices different from the interface specification, where the interface specification does not conform to the one or more programming best practices, in various embodiments.

Responsive to receiving the request, as shown in 405, a particular API category may be identified for the specification, the category identifying specific best practices for which to apply to the API to generate the requested bindings. To identify the category to which the API is directed, additional interface usage information, such as additional usage information 115 of FIG. 1, may be provided. In some embodiments, this interface usage information may be provided in a number of ways. For example, in some embodiments the interface specification itself may include specification of interface category or interface usage. In other embodiments, interface usage or category may be provided by a client or developer requesting generation of language bindings for the API. In still other embodiments, interface category or interface usage may be deduced from additional documentation associated with the API. These are merely examples of providing interface usage information and are not intended to be limiting.

Responsive to determining the API category, as shown in 410, the interface generator may access a knowledge base or database, such as the knowledge base 130 of FIG. 1, that includes examples of best practices of particular API categories, where at least some of the best practices are specific to the identified category and an output format different from the interface definition format and where the respective definitions of related callable functions do not conform to any of the best practices for the category and format in the knowledge base. The knowledge base may include both language-specific and language neutral best practices. For example, a collection of design patterns describing well-established solution approaches to understood programming problems may be included, definitions for common data structures and data types, definitions of common data translations, data unit conversions, access, authentication and security mechanisms, and so forth may be included in the knowledge base.

As shown in 420, the interface generator may then apply the various best practices for the identified category of the knowledge base to generate a set of idiomatic language bindings for the API specification providing the functionality of the APIs of the interface specification, where the idiomatic language bindings conform to at least a portion of the best practices of the knowledge base while retaining the functionality offered by the APIs of the API specification. For example, an API of the specification might describe an executable function that requires, as an input parameter, data of a particular type that is inconvenient or represented differently that otherwise common for a particular programming language. For example, the parameter may be integral or floating point numeric type that is non-standard for the particular programming language, or may be a string format different than supported in the particular programming language. In another example, the parameter may provide authorization credentials for an operation, where the credentials may take various forms other than supported by the API of the specification. In still other examples, parameters may be expressed in units particular to the API while the particular programming language may standardize on different units. In some embodiments, a particular programming language may support optional or default arguments whereas the API of the specification may support fewer more restrictive options. In some embodiments, usage of particular API functions may require encoding of redundant information that is deducible from programming context, thereby introducing opportunities for errors in usage of the API. In this case, automatic generation of this information may be employed to simplify usage of the API through the idiomatic bindings and reduce opportunities for errors. The idiomatic language bindings may be expressed in an output format usable by software development compilers or other tools and different from the language-neutral format of the interface specification, and the bindings may provide access to the related callable functions of the API specification while conforming to the best practices of the knowledge base, in various embodiments.

In addition, the interface generator may, though applying best practices of the knowledge base, include additional resources beyond the callable methods and functions described in the interface description. Therefore, in addition to interface declarations output to the language specific interface, the interface generator may include common data types, data structures, variables, objects and other resources that may be useful to a client when using the API described in interface description, in various embodiments. Furthermore, the interface generator may provide executable code in the form of helper functions, for example to marshal data, perform unit conversions, and so forth. Furthermore, while the API of the interface description may document callable functions and methods, a target language of a language specific interface may provide other mechanisms for executing code, such as lambda functions, for example. As such, the interface generator may include support for executing various methods or functions of the API in alternative forms and further apply various best practices and design patterns suitable in the target language but not describable in the language-neutral format, in various embodiments.

As shown in 430, the interface generator may then export the generated bindings formatted in the output format for processing by software development compilers or other software development tools, such as the software development service 230 of FIG. 2.

Figure 5:
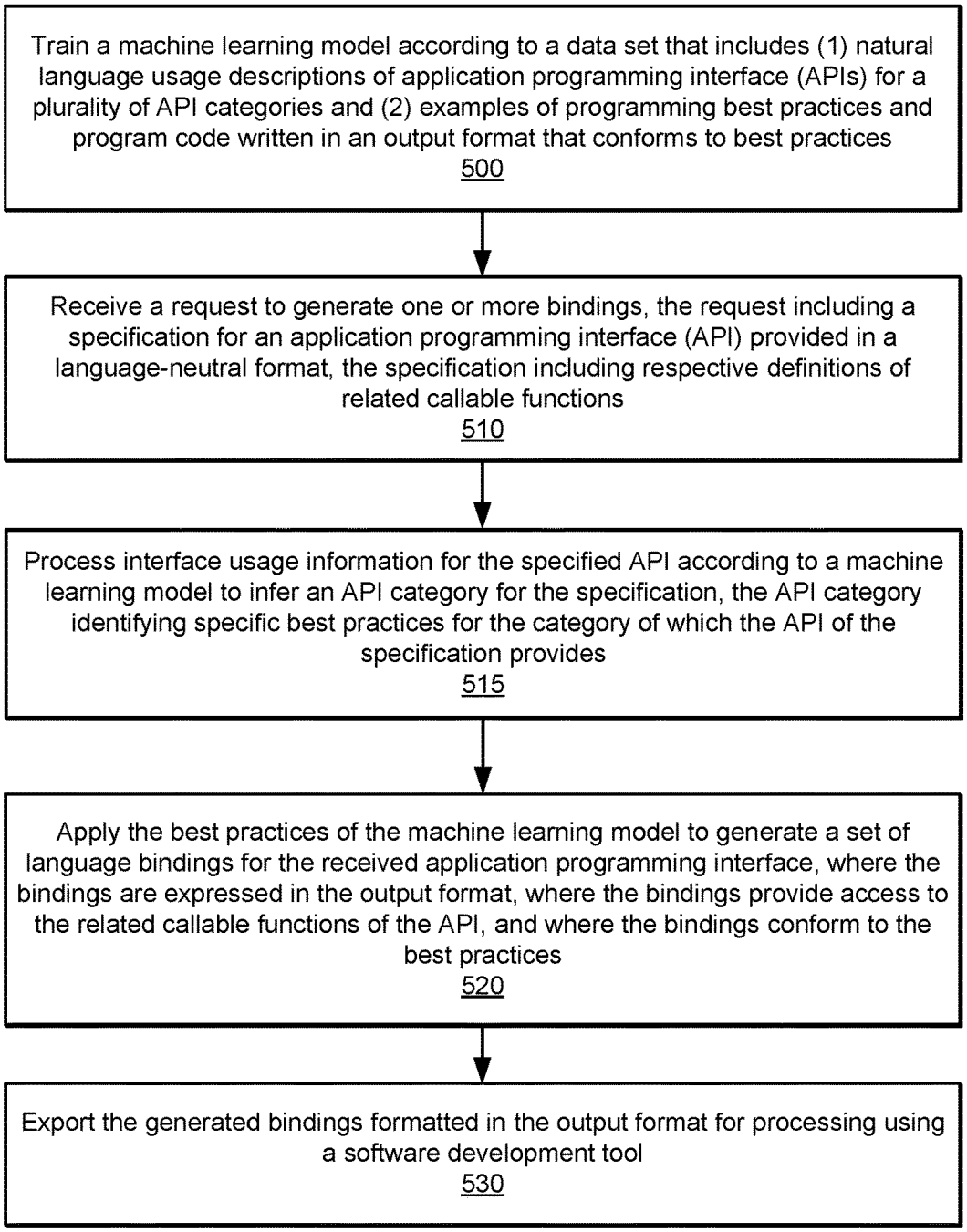
FIG. 5 illustrates a logical flowchart illustrating generating of idiomatic interfaces using a machine learning model from a specification using an interface definition language, according to some embodiments.

FIG. 5 illustrates a logical flowchart illustrating generating of idiomatic interfaces using a machine learning model from a specification using an interface definition language, according to some embodiments. The process begins at 500, where an interface generator, code generator or artifact generator such as the interface generator 100 of FIG. 1, may train a machine learning model, such as the machine learning model 303 of FIG. 3, using language-specific and language-neutral code that includes examples of design patterns for various API categories and specific languages as well as programming best practices. For example, a collection of design patterns describing well-established solution approaches to understood programming problems may be included, definitions for common data structures and data types, definitions of common data translations, data unit conversions, access, authentication and security mechanisms, and so forth may be included in the training data. In addition, language neutral best practices and design patterns may be included in training data.

In addition, natural-language usage descriptions may be included in the training data, in some embodiments. To identify a particular category to which the API is directed, the machine learning model may be trained to recognize various interface categories using natural language descriptions or discussion pertaining to existing APIs other than the API specified in interface description. Examples of such information include technical descriptions of the APIs, use cases of the APIs including source code provided in the plurality of languages or in pseudo-code similar to the plurality of languages, client discussions of the API, previous versions of the API or APIs similar to the API, frequently asked questions (FAQs) regarding the API or similar APIs and descriptions of similarities and differences of the API to the one or more other APIs. These examples are not intended to be limiting and a variety of natural language information may be envisioned to include in the training data.

Then, as shown in 510, a request to generate binding(s) for an application programming interface (API) may be received, the request including a specification for an API), such as the interface description 110 of FIG. 3, may be received at an interface generator, code generator or artifact generator such as the interface generator 300 of FIG. 3, where the specification includes at least respective definitions of related callable functions or methods of an API. This specification may be received, in some embodiments, to generate one or more idiomatic language-specific interface definitions, executable code or code definitions, or artifacts for various output languages or formats different from the interface definition format. These language-specific interface definitions are generated to conform to one or more programming best practices different from the interface specification, where the interface specification does not conform to the one or more programming best practices, in various embodiments.

Responsive to receiving the request, as shown in 515, a particular API category may be identified for the specification, the category identifying specific best practices for which to apply to the API to generate the requested bindings. An inference engine, such as inference engine 302 of FIG. 3, may apply a machine learning model, such as machine learning model 303 of FIG. 3, to process natural language information regarding the usage of the interface specified in the interface description to determine an API category. For example, natural language descriptions such as technical descriptions of the APIs, use cases of the APIs including source code provided in the plurality of languages or in pseudo-code similar to the plurality of languages, client discussions of the API or previous versions of the API, frequently asked questions (FAQs) regarding the API and descriptions of similarities and differences of the API to the one or more other APIs may be processed by the inference engine to deduce interface category. These are merely examples of natural language interface usage information 115 and are not intended to be limiting. In this way, the inference engine may provide identification of an API categories through natural language processing, in some embodiments.

Responsive to determining the interface category, as shown in 520, the inference engine of the interface generator may apply the various best practices via processing by the machine learning model to generate idiomatic APIs providing the functionality of the APIs of the interface description 110, where the idiomatic APIs conform to at least a portion of the best practices for the determined API category while retaining the functionality offered by the APIs of the interface specification. For example, an API of the interface specification might describe an executable function that requires, as an input parameter, data of a particular type that is inconvenient or represented differently that otherwise common for a particular programming language. For example, the parameter may be integral or floating point numeric type that is non-standard for the particular programming language, or may be a string format different than supported in the particular programming language. In another example, the parameter may provide authorization credentials for an operation, where the credentials may take various forms other than supported by the API of the interface specification. In still other examples, parameters may be expressed in units particular to the API while the particular programming language may standardize on different units. In some embodiments, a particular programming language may support optional or default arguments whereas the API of the interface specification may support fewer more restrictive options. In some embodiments, usage of particular API functions may require encoding of redundant information that is deducible from programming context, thereby introducing opportunities for errors in usage of the API. In this case, automatic generation of this information may be employed to simplify usage of the API through the idiomatic bindings and reduce opportunities for errors.

As shown in 520, the interface generator may process the specification using the machine learning model to apply the various best practices generating a set of idiomatic language bindings for the API specification providing the functionality of the APIs of the interface specification, where the idiomatic language bindings conform to at least a portion of the best practices of the knowledge base while retaining the functionality offered by the APIs of the API specification. For example, an API of the specification might describe an executable function that requires, as an input parameter, data of a particular type that is inconvenient or represented differently that otherwise common for a particular programming language. For example, the parameter may be integral or floating point numeric type that is non-standard for the particular programming language, or may be a string format different than supported in the particular programming language. In another example, the parameter may provide authorization credentials for an operation, where the credentials may take various forms other than supported by the API of the specification. In still other examples, parameters may be expressed in units particular to the API while the particular programming language may standardize on different units. In some embodiments, a particular programming language may support optional or default arguments whereas the API of the specification may support fewer more restrictive options. In some embodiments, usage of particular API functions may require encoding of redundant information that is deducible from programming context, thereby introducing opportunities for errors in usage of the API. In this case, automatic generation of this information may be employed to simplify usage of the API through the idiomatic bindings and reduce opportunities for errors. The idiomatic language bindings may be expressed in an output format usable by software development compilers or other tools and different from the language-neutral format of the interface specification, and the bindings may provide access to the related callable functions of the API specification while conforming to the best practices of the knowledge base, in various embodiments.

In addition, the interface generator may, though applying best practices of the knowledge base, include additional resources beyond the callable methods and functions described in the interface description. Therefore, in addition to interface declarations output to the language specific interface, the interface generator may include common data types, data structures, variables, objects and other resources that may be useful to a client when using the API described in interface description, in various embodiments. Furthermore, the interface generator may provide executable code in the form of helper functions, for example to marshal data, perform unit conversions, and so forth. Furthermore, while the API of the interface description may document callable functions and methods, a target language of a language specific interface may provide other mechanisms for executing code, such as lambda functions, for example. As such, the interface generator may include support for executing various methods or functions of the API in alternative forms and further apply various best practices and design patterns suitable in the target language but not describable in the language-neutral format, in various embodiments.

As shown in 530, the interface generator may then export the generated bindings formatted in the output format for processing by software development compilers or other software development tools, such as the software development service 230 of FIG. 2.

Figure 6:
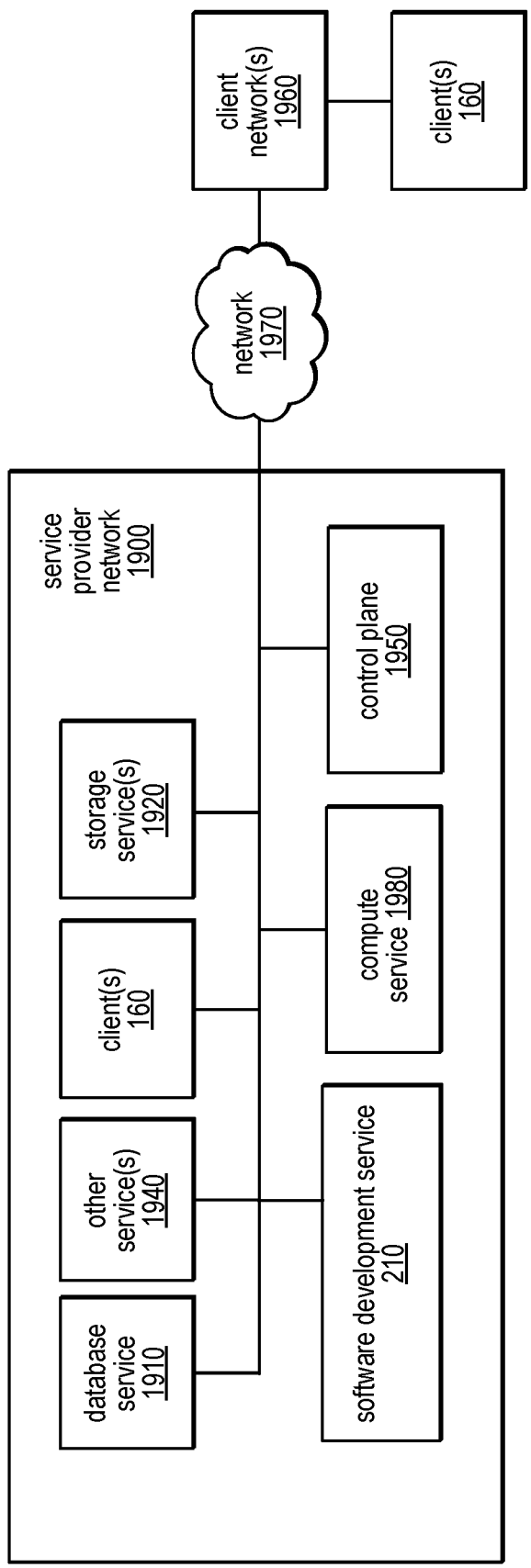
FIG. 6 illustrates an example provider network environment, according to at least some embodiments.

FIG. 6 illustrates an example provider network environment, according to at least some embodiments. In the illustrated embodiment, natural language processing service 210 is provided by service provider network 1900. Service provider network 1900 is illustrated as providing numerous other services 1940, such as, but not limited to, a database service 1910 (providing relational, non-relational database services, or both), storage service(s) 1920 (e.g., key-value store, short-term, long-term, or the like, etc.), compute service 1980 (e.g., providing virtual computing capabilities), anonymizer service 1930 (e.g. providing data translation capabilities described herein) and other services 1940 as well as and clients 160. Clients 160 are illustrated as both external (communicably coupled via client networks 1960 and intermediate network 1970 (e.g., the Internet or similar) to the service provider network) and internal to the service provider network. In some embodiments, one of the services of the service provider network may be a client of another one of the services.

Service provider network 1900 may be formed as a number of regions, where a region is a separate geographical area in which the cloud provider clusters data centers. Each region may include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone.

Preferably, availability zones within a region may be positioned far enough away from one other that the same natural disaster should not take more than one availability zone offline at the same time. Users may connect to availability zones of the service provider network 1900 via a publicly accessible network (e.g., the Internet, a cellular communication network). Regions are connected to a global network which includes private networking infrastructure (e.g., fiber connections controlled by the cloud provider) connecting each region to at least one other region. The service provider network 1900 may deliver content from points of presence outside of, but networked with, these regions by way of edge locations and regional edge cache servers. An edge location may be an extension of the cloud provider network outside of the traditional region/AZ context. For example an edge location may be a data center positioned to provide capacity to a set of customers within a certain latency requirement, a set of servers provided to a customer's premises, or a set of servers provided within (or forming part of) a cellular communications network, each of which may be controlled at least in part by the control plane of a nearby AZ or region. This compartmentalization and geographic distribution of computing hardware enables the service provider network 1900 to provide low-latency resource access to customers on a global scale with a high degree of fault tolerance and stability.

The traffic and operations of the cloud provider network may broadly be subdivided into two categories in various embodiments: control plane operations carried over a logical control plane 1950 and data plane operations carried over a logical data plane. While the data plane represents the movement of user data through the distributed computing system, the control plane 1950 represents the movement of control signals through the distributed computing system.

The control plane generally includes one or more control plane components distributed across and implemented by one or more control servers. Control plane traffic generally includes administrative operations, such as system configuration and management (e.g., resource placement, hardware capacity management, diagnostic monitoring, system state information).

The data plane includes customer resources that are implemented on the cloud provider network (e.g., compute instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

In some embodiments, service provider network 1900 may include the hardware (e.g., modems, routers, switches, load balancers, proxy servers, etc.) and software (e.g., protocol stacks, accounting software, firewall/security software, etc.) necessary to establish a networking links between different components of service provider network 1900, such as computation and storage hosts, control plane components as well as external networks, such as network (e.g., the Internet). In some embodiments, service provider network 1900 may employ an Internet Protocol (IP) tunneling technology to provide an overlay network via which encapsulated packets may be passed through the internal network using tunnels. The IP tunneling technology may provide a mapping and encapsulating system for creating an overlay network and may provide a separate namespace for the overlay layer and the internal network layer. Packets in the overlay layer may be checked against a mapping directory to determine what their tunnel target should be. The IP tunneling technology provides a virtual network topology; the interfaces that are presented to clients 160 may be attached to the overlay network so that when a client provides an IP address that they want to send packets to, the IP address is run in virtual space by communicating with a mapping service that knows where the IP overlay addresses are.

Any of various computer systems may be configured to implement processes associated with a technique for multi-region, multi-primary data store replication as discussed with regard to the various figures above. FIG. 10 is a block diagram illustrating one embodiment of a computer system suitable for implementing some or all of the techniques and systems described herein. In some cases, a host computer system may host multiple virtual instances that implement the servers, request routers, storage services, control systems or client(s). However, the techniques described herein may be executed in any suitable computer environment (e.g., a cloud computing environment, as a network-based service, in an enterprise environment, etc.).

Figure 7:
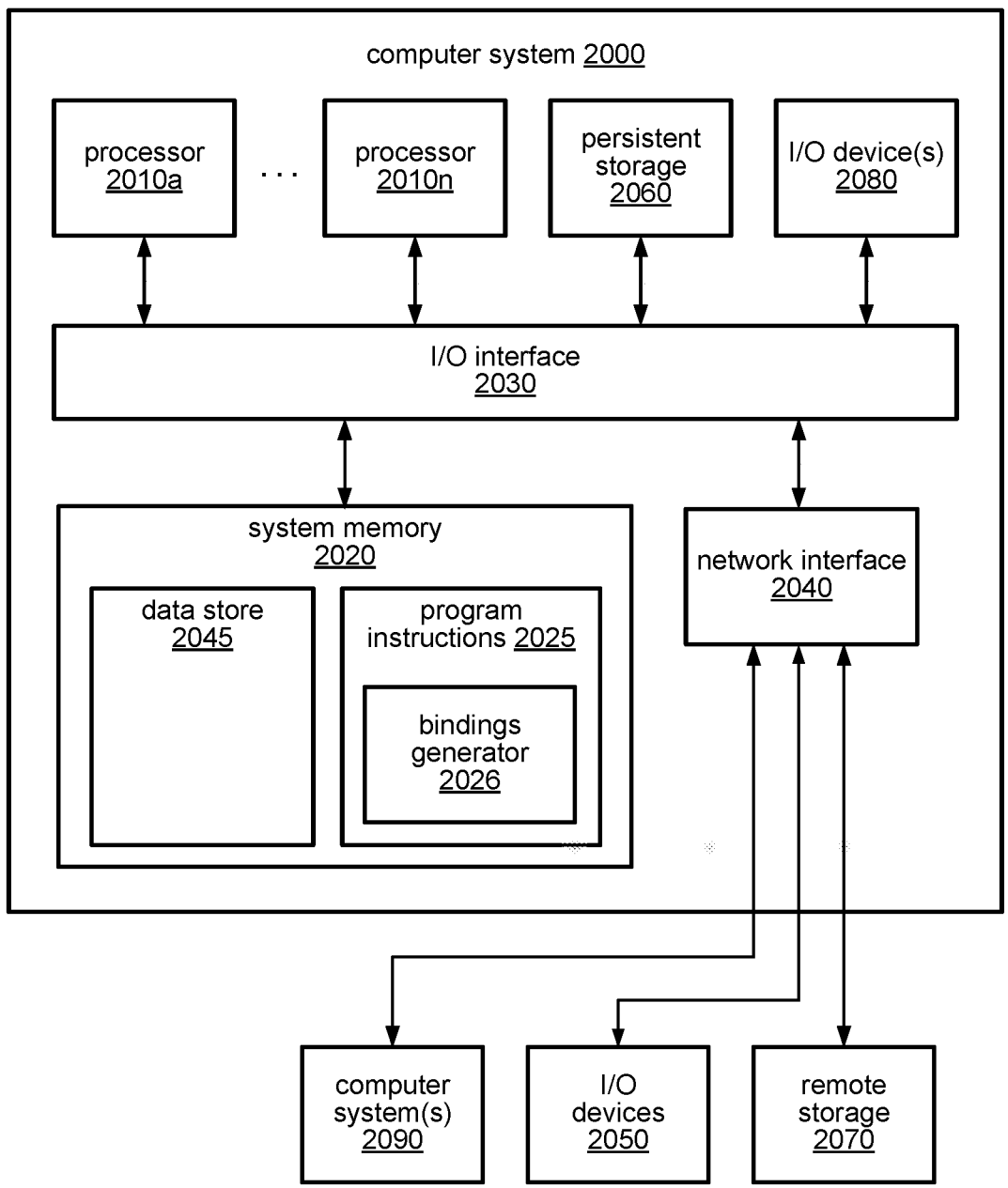
FIG. 7 is a block diagram illustrating an example computing device that may be used in at least some embodiments.

Various ones of the illustrated embodiments may include one or more computer systems 2000 such as that illustrated in FIG. 7 or one or more components of the computer system 2000 that function in a same or similar way as described for the computer system 2000.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030. In some embodiments, computer system 2000 may be illustrative of servers implementing enterprise logic or downloadable applications, while in other embodiments servers may include more, fewer, or different elements than computer system 2000.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the embodiments described herein. In another example, an instance of a server application executing on computer system 2000 may use network interface 2040 to communicate with other instances of the server application (or another server application) that may be implemented on other computer systems (e.g., computer systems 2090).

System memory 2020 may store instructions and data accessible by processor 2010. In various embodiments, system memory 2020 may be implemented using any suitable memory technology, such as static random-access memory (SRAM), synchronous dynamic RAM (SDRAM), non-volatile/Flash-type memory, or any other type of memory. In the illustrated embodiment, program instructions and data implementing desired functions, such as those methods and techniques as described above for binding generator as indicated at 2026, for the downloadable software or provider network are shown stored within system memory 2020 as program instructions 2025. In some embodiments, system memory 2020 may include data store 2045 which may be configured as described herein.

In some embodiments, system memory 2020 may be one embodiment of a computer-accessible medium that stores program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 2000 via I/O interface 2030. A computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

In one embodiment, I/O interface 2030 may coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may allow data to be exchanged between computer system 2000 and other devices attached to a network, such as between a client device and other computer systems, or among hosts, for example. In particular, network interface 2040 may allow communication between computer system 800 and/or various other device 2060 (e.g., I/O devices). Other devices 2060 may include scanning devices, display devices, input devices and/or other communication devices, as described herein. Network interface 2040 may commonly support one or more wireless networking protocols (e.g., Wi-Fi/IEEE 802.7, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, I/O devices may be relatively simple or "thin" client devices. For example, I/O devices may be implemented as dumb terminals with display, data entry and communications capabilities, but otherwise little computational functionality. However, in some embodiments, I/O devices may be computer systems implemented similarly to computer system 2000, including one or more processors 2010 and various other devices (though in some embodiments, a computer system 2000 implementing an I/O device 2050 may have somewhat different devices, or different classes of devices).

In various embodiments, I/O devices (e.g., scanners or display devices and other communication devices) may include, but are not limited to, one or more of: handheld devices, devices worn by or attached to a person, and devices integrated into or mounted on any mobile or fixed equipment, according to various embodiments. I/O devices may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 2000. In general, an I/O device (e.g., cursor control device, keyboard, or display(s) may be any device that can communicate with elements of computing system 2000.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein.

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Embodiments of a database migration service and deployment as described herein may be executed on one or more computer systems, which may interact with various other devices. FIG. 7 is a block diagram illustrating an example computer system, according to various embodiments. For example, computer system 2000 may be configured to implement nodes of a compute cluster, a distributed key value data store, and/or a client, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of compute node, computing node, or computing device.

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may be a storage host, and persistent storage 2060 may include the SSDs attached to that server node.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more processors; and
a memory storing program instructions that, when executed on the one or more processors, implement a binding generator configured to:
receive a specification for an application programming interface (API) provided in an interface definition format, the specification comprising respective definitions for one or more related callable methods; and
generate at least one idiomatic language binding comprising second respective definitions for the one or more related callable methods of the API provided in a format other than the interface definition format and generated based at least in part on the respective definitions for the one or more related callable methods, the format machine-readable by a software development compiler to generate executable code, wherein generating the at least one idiomatic language binding comprises:
train a machine learning model according to at least a plurality of design patterns for the format;
process the specification by the machine learning model to generate the at least one idiomatic language binding, the at least one idiomatic language binding comprising:
executable code definitions conforming to at least one design pattern, of the plurality of design patterns, for the format;
one or more data type definitions not defined in the specification of the API; and
one or more respective resources corresponding to one or more resource definitions of the specification and one or more other resources not defined in the specification associated with at least one of the one or more resource definitions;
wherein the specification for the API does not conform to the at least one design pattern for the format.

2. The system of claim 1, wherein the machine learning model is trained according to one or more design patterns independent of the format; wherein the executable code definitions conform to at least one of the one or more design patterns, and wherein the at least one idiomatic language binding comprises one or more resources according to at least one of the one or more design patterns independent of the format.

3. The system of claim 1, wherein to generate the at least one idiomatic language binding the binding generator is further configured to:
process a previous version of the at least one idiomatic language binding generated according to a previous version of the specification for the API to identify one or more compatibility constraints for the at least one idiomatic language binding; and
constrain the at least one idiomatic language binding according to the identified one or more compatibility constraints.

4. The system of claim 1, wherein the binding generator is implemented as part of an application development service offered by a provider network, and wherein the API is one of a plurality of APIs to provide access to respective services of the provider network.

5. A method, comprising:
performing, by a binding generator:
training a machine learning model according to:
a plurality of natural language usage descriptions of application programming interfaces (APIs) for a plurality of API usage categories; and
a plurality of best practices of the plurality of API usage categories for a plurality of languages machine-readable by one or more software development tools to generate executable code, wherein the plurality of best practices comprise design patterns describing solutions to programming problems;
receiving a request to generate at least one idiomatic language binding for an API, the request comprising:
one or more natural language descriptions of the API; and
a specification of the API provided in an interface definition language different from the plurality of languages, the specification comprising respective definitions for one or more related callable functions; and
generating the at least one idiomatic language binding comprising second respective definitions for the one or more related callable functions of the API callable in a language of the plurality of languages and generated based at least in part on the respective definitions for the one or more related callable functions, wherein generating the at least one binding comprises:
processing the one or more natural language descriptions of the API by the machine learning model to identify an API usage category of the plurality of API usage categories; and
processing the specification of the API by the machine learning model to generate the at least one idiomatic language binding, wherein the at least one idiomatic language binding comprises executable code definitions conforming to at least one best practice, of the plurality of best practices, for the language, of the plurality of languages, according to the identified API usage category, wherein the specification of the API does not conform to the at least one best practice, of the plurality of best practices, for the language of the plurality of languages according to the identified API usage category.

6. The method of claim 5, wherein the one or more natural language descriptions of the API comprise one or more of:
technical descriptions of the API;
use cases of the API, the use cases comprising source code provided in the plurality of languages or in pseudocode;
client discussions of the API or one or more other APIs; and
descriptions of similarities and differences of the API to the one or more other APIs.

7. The method of claim 5, wherein the language of the plurality of languages is an object oriented language, and wherein the generated at least one idiomatic language binding comprises one or more classes collectively incorporating the one or more related callable functions of the API as executable methods.

8. The method of claim 5, wherein generating the at least one idiomatic language binding further comprises:
processing a previous version of the at least one idiomatic language binding generated according to a previous version of the specification for the API to identify one or more compatibility constraints for the at least one idiomatic language binding; and
constraining the at least one idiomatic language binding according to the identified one or more compatibility constraints.

9. The method of claim 5, wherein the at least one idiomatic language binding comprises one or more data type definitions not defined in the specification of the API.

10. The method of claim 5, wherein the specification comprises one or more resource definitions, and wherein the at least one idiomatic language binding comprises one or more respective resources corresponding to the one or more resource definitions and one or more other resources not defined in the specification of the API associated with at least one of the one or more resource definitions.

11. The method of claim 5, wherein the machine learning model is trained according to one or more best practices independent of the language, and wherein the executable code definitions conform to at least one of the one or more best practices.

12. The method of claim 5, wherein a knowledge base is maintained according to one or more best practices independent of the language; and wherein the at least one idiomatic language binding comprises one or more resources according to at least one of the one or more best practices independent of the language.

13. The method of claim 5, wherein the binding generator is implemented as part of an application development service offered by a provider network, and wherein the API is one of a plurality of APIs to provide access to respective services of the provider network.

14. One or more non-transitory computer-accessible storage media storing program instructions that when executed on or across one or more computing devices cause the one or more computing devices to implement a binding generator to perform:
training a machine learning model according to:
a plurality of natural language usage descriptions of application programming interface (APIs) for a plurality of API usage categories; and
a plurality of design patterns of the plurality of API usage categories for a plurality of formats machine-readable by one or more software development tools to generate executable code;
receiving a request to generate at least one idiomatic language binding for an API, the request comprising:
one or more natural language descriptions of the API; and
a specification of the API provided in an interface definition format, the specification comprising respective definitions for one or more related callable methods; and
generating the at least one idiomatic language binding comprising second respective definitions for the one or more related callable methods of the API callable in a format other than the interface definition format and generated based at least in part on the respective definitions for the one or more related callable functions, wherein generating the at least one idiomatic language binding comprises:
processing the one or more natural language descriptions of the API by the machine learning model to identify an API usage category of the plurality of API usage categories; and
processing the specification of the API by the machine learning model to generate the at least one idiomatic language binding, the at least one idiomatic language binding comprising executable code definitions conforming to at least one design pattern, of the plurality of design patterns, for the format according to the identified API usage category, wherein the specification for the API does not conform to the at least one design pattern for the format according to the identified API usage category.

15. The one or more non-transitory computer-accessible storage media of claim 14, wherein the one or more natural language descriptions of the API comprise one or more of:
technical descriptions of the API;
use cases of the API, the use cases comprising source code provided in the plurality of languages or in pseudo-code;
client discussions of the API or one or more other APIs; and
descriptions of similarities and differences of the API to the one or more other APIs.

16. The one or more non-transitory computer-accessible storage media of claim 14, wherein generating the at least one idiomatic language binding further comprises:
processing a previous version of the at least one idiomatic language binding generated according to a previous version of the specification for the API to identify one or more compatibility constraints for the at least one idiomatic language binding; and
constraining the at least one idiomatic language binding according to the identified one or more compatibility constraints.

17. The one or more non-transitory computer-accessible storage media of claim 14, wherein the specification comprises one or more resource definitions, and wherein the at least one idiomatic language binding comprises:
one or more data type definitions not defined in the specification of the API; and
one or more respective resources corresponding to the one or more resource definitions and one or more other resources not defined in the specification of the API associated with at least one of the one or more resource definitions.

18. The one or more non-transitory computer-accessible storage media of claim 14, wherein the machine learning model is trained according to one or more design patterns independent of an output format; and wherein the executable code definitions conform to at least one of the one or more design patterns.

19. The one or more non-transitory computer-accessible storage media of claim 14, wherein the machine learning model is maintained according to one or more design patterns independent of an output format; and wherein the at least one idiomatic language binding comprises one or more resources according to at least one of the one or more design patterns independent of the output format.

20. The one or more non-transitory computer-accessible storage media of claim 14, wherein the binding generator is implemented as part of an application development service offered by a provider network, and wherein the API is one of a plurality of APIs to provide access to respective services of the provider network.

* * * * *